United States Patent
Jonas

(10) Patent No.: US 8,290,968 B2
(45) Date of Patent: Oct. 16, 2012

(54) HINT SERVICES FOR FEATURE/ENTITY EXTRACTION AND CLASSIFICATION

(75) Inventor: Jeffrey J. Jonas, Las Vegas, NV (US)

(73) Assignee: International Business Machines Corporation, Armonk, NY (US)

(*) Notice: Subject to any disclaimer, the term of this patent is extended or adjusted under 35 U.S.C. 154(b) by 96 days.

(21) Appl. No.: 12/825,298

(22) Filed: Jun. 28, 2010

(65) Prior Publication Data

US 2011/0320455 A1    Dec. 29, 2011

(51) Int. Cl.
G06F 7/00 (2006.01)
(52) U.S. Cl. .......... 707/756; 707/793; 707/811
(58) Field of Classification Search .......... None
See application file for complete search history.

(56) References Cited

U.S. PATENT DOCUMENTS

| | | | |
|---|---|---|---|
| 5,991,758 A * | 11/1999 | Ellard | 1/1 |
| 7,685,201 B2 | 3/2010 | Zeng et al. | |
| 2005/0149522 A1* | 7/2005 | Cookson et al. | 707/7 |
| 2005/0251406 A1 | 11/2005 | Bolt et al. | |
| 2006/0161531 A1* | 7/2006 | Khandelwal et al. | 707/3 |
| 2007/0100814 A1 | 5/2007 | Lee et al. | |
| 2008/0114800 A1 | 5/2008 | Gazen et al. | |
| 2009/0019032 A1 | 1/2009 | Bundschus et al. | |
| 2009/0119274 A1 | 5/2009 | Tsuzuki et al. | |
| 2009/0222395 A1 | 9/2009 | Light et al. | |
| 2009/0282012 A1* | 11/2009 | Konig et al. | 707/5 |
| 2010/0070339 A1 | 3/2010 | Bae et al. | |
| 2010/0070505 A1 | 3/2010 | Kao et al. | |
| 2010/0076972 A1 | 3/2010 | Baron et al. | |
| 2010/0211609 A1* | 8/2010 | Xiong et al. | 707/803 |

OTHER PUBLICATIONS

Myung et al.; "PicAChoo: A Tool for Customizable Feature Extraction Utilizing Characteristics of Textual Data", ICUIMC-09, Suwon, South Korea, Jan. 15-16, 2009.
Cafarella et al.; "Structured Querying of Web Text", 3rd Bennial Conference on Innovative Data Systems Research CIDR, Asilomar, California, Jan. 7-10, 2007.
Sudo et al.; "Using Information Extraction for Quality Analysis in Human Authentication", 38th Annual Hawaii Inter. Conf. on, HICSS'05, Jan. 3-6, 2005.

* cited by examiner

*Primary Examiner* — Fred I Ehichioya
*Assistant Examiner* — Anh Tai Tran
(74) *Attorney, Agent, or Firm* — Patterson & Sheridan, LLP

(57) ABSTRACT

Systems, methods and articles of manufacture are disclosed for extracting a feature of an entity. A data record that includes the feature may be received. The feature may be characterized. Data related to the feature may be retrieved from a data source. The feature may be recharacterized based on the retrieved data. The data source may be updated with an association between the recharacterized feature and the retrieved data.

23 Claims, 5 Drawing Sheets

152

During the midnight shift Jackson Hewitt of 1342 S. Bell Ave Apt 56 was seen driving a white mustang convertible with plate number 123 XYZ. He later turned up unconscious on Route 1 approximately 3.2 miles South of Exit 52.

FIG. 2

| WORD/PHRASE — 302 | CLASSIFICATION — 304 | CERTAINTY — 306 |
|---|---|---|
| "Jackson Hewitt" | Company name | 96% |
| "1342 Bellwether Ave Apt 56" | Address | 98% |
| "Route 1" | Road | 87% |
| "Exit 52" | A location | 83% |

| NAME | ADDRES | CLASSIFICATION |
|---|---|---|
| Jackson 5 | 123 Main St., Memphis, TN | Musical Band |
| Jackson Hewitt | 321 1st St.. Columbus, OH | Business |
| Jackson Hewitt | POB 766 Santa Rosa, CA | Individual |
| Jackson Hewitt | 1342 S. Bell Ave Apt 56 | Individual |
| Jackson Purcell | 11 Winter St. | Individual |

402 — NAME
404 — ADDRES
406 — CLASSIFICATION
408

| WORD/PHRASE ~302 | CLASSIFICATION ~304 | CERTAINTY ~306 |
|---|---|---|
| "Jackson Hewitt" | Individual | 99.9% |
| "1342 Bellwether Ave Apt 56" | Address | 98% |
| "Route 1" | Road | 87% |
| "Exit 52" | Location | 83% |

| FREQUENCY ~602 | FEATURE TYPE ~604 |
|---|---|
| 1345 | Business |
| 432 | Individual |
| 3 | Location |
| 1 | Musical Band |

| FREQUENCY ~602 | FEATURE TYPE ~604 |
|---|---|
| 1 | Individual |

(702)

HINT SERVICES FOR FEATURE/ENTITY EXTRACTION AND CLASSIFICATION

BACKGROUND

1. Field

Embodiments of the invention relate to techniques for entity extraction. More specifically, embodiments of the invention relate to improving feature and entity extraction and classification.

2. Description of the Related Art

Feature and entity extraction applications extract structured data from unstructured data. Examples include extracting a license plate number from a video of a passing car, or extracting "Mark Smith, DOB Jun. 17, 1976, 123 Main Street" from a narrative police report. The applications may also classify extracted features. For example, the applications may classify "123 XYZ" as a license plate and "Mark Smith" as a first name and last name. Further, the entity extraction algorithms may require training data and/or manual tuning. Once trained and/or tuned, the applications may evaluate unstructured data to extract and classify features and entities.

SUMMARY

Embodiments of the invention provide a computer-implemented method, computer program product, and system for performing operations for extracting and classifying features of entities. The computer program product may include a computer-readable storage medium having computer-readable program code embodied therewith, the computer-readable program code configured to perform the operations. The system may include one or more computer processors and a memory containing a program, which when executed by the one or more computer processors is configured to perform the operations. The operations may generally include receiving a first data record comprising a feature of a first entity. The operations may also include retrieving, from a data source, contextual information related to the feature of the first entity. The operations may also include characterizing the feature of the first entity based on the retrieved contextual information related to the feature of the first entity. The operations may also include updating the data source based on the characterized feature.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 2 illustrates an exemplary data record, according to one embodiment of the invention.

FIG. 3 illustrates features extracted and classified by an application for extracting and classifying features and/or entities, according to one embodiment of the invention.

FIG. 4 illustrates exemplary data related to an extracted feature, according to one embodiment of the invention.

FIG. 5 illustrates features extracted and classified by the application, according to one embodiment of the invention.

FIG. 6 illustrates frequency information computed from the related data, according to one embodiment of the invention.

FIG. 7 illustrates frequency information computed from related data that is retrieved based on a query from the application, according to one embodiment of the invention.

DETAILED DESCRIPTION

Figure 1:
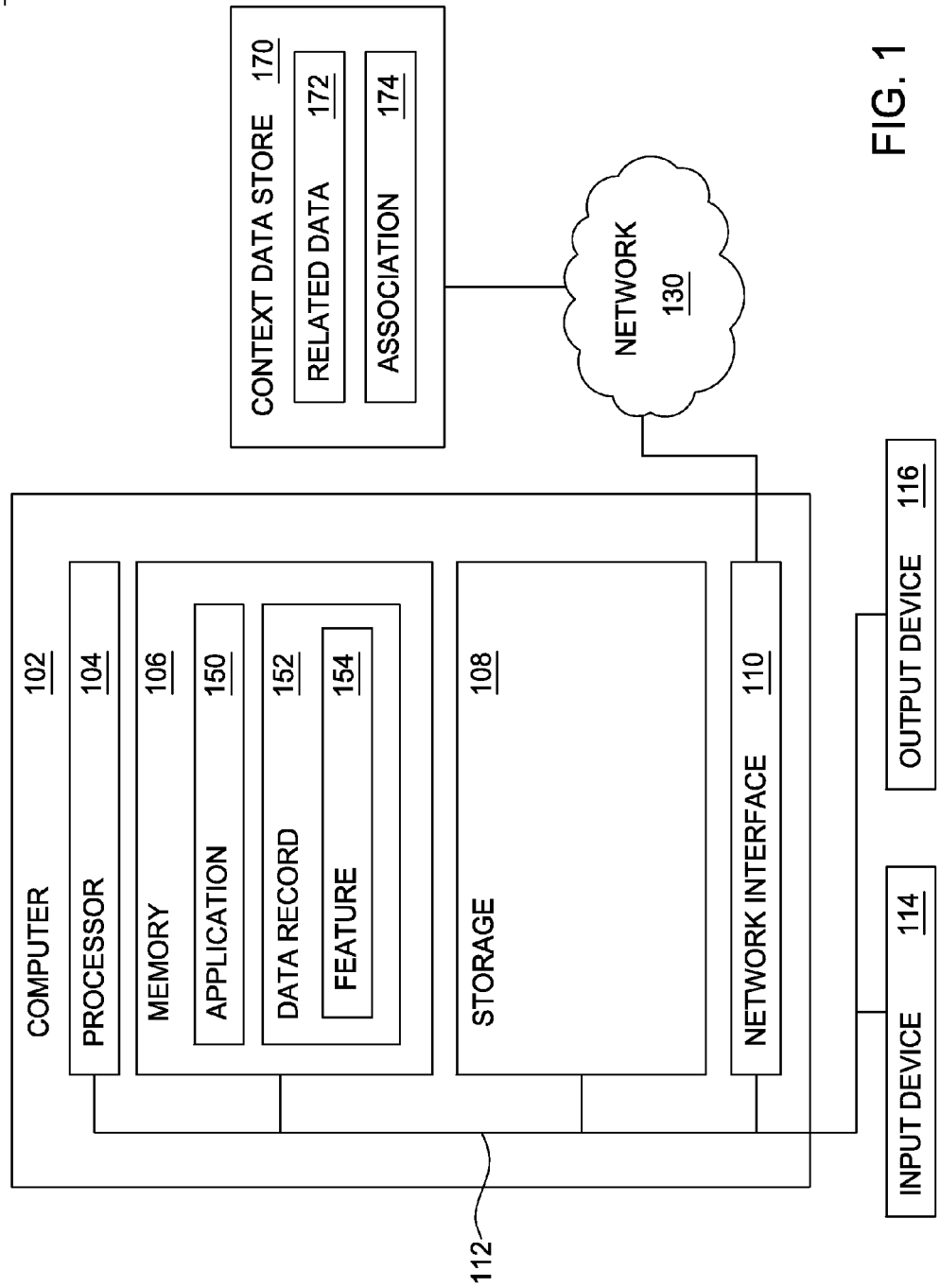
FIG. 1 is a block diagram illustrating a system for extracting and classifying features and/or entities, according to one embodiment of the invention.

Embodiments of the present invention generally provide techniques for feature and entity extraction and/or classification. One embodiment of the invention provides an application configured to process unstructured media (documents, video, blog feeds, etc.) to locate features and to perform classification on these features. An entity resolution application may subsequently use the classified features to perform entity resolution—i.e., to resolve identity records into one or more entities dossiers. Each entity dossier represents a distinct individual and may result from one or more identity records being resolved into the same entity dossier (referred to as an entity).

In one embodiment, the application extracts a feature (e.g., "Jackson Hewitt") from a received data record, which may contain unstructured data. The application may characterize the extracted feature. For example, the application may characterize Jackson Hewitt as a name of a business. Further, the application may re-characterize the feature based on data retrieved from a context data store. In one embodiment, the context data store may contain reference data, historical data, current information up-to-the-second, etc. and may include what the application has observed and/or learned from processing previous data records. That is, the context data store may be a real-time, incrementally learning system as opposed to a static, reference data set. The context data store may contain historical observations, up to the moment observations, entities contained in these observations, classified features of these entities, persistent assertions about entities including relationships between entities. The nature of the invention is not limited to identity, as described above, but in fact can be used for other types of entities including organizations, locations, events, things, biological structures, and so on.

As described above, in one embodiment, the application may re-characterize the extracted feature based on data retrieved from the context data store. The retrieved data may be related to the unstructured data. For instance, the application may recharacterize Jackson Hewitt as a name of an individual, despite initially being considered an organization. The application may update the context data store to reflect the recharacterized feature, thereby improving an ability of the context data store to provide hints to subsequent feature extraction and classification. In one embodiment, a hint refers to a unit of information to allow or to improve the extraction and classification of features from the unstructured data. In some embodiments, a hint may be an assertion associated with a characterized feature and/or an entity. A hint may also assist an entity extractor determine which extracted features belong with entities (i.e., if there are two names and two addresses referenced in the unstructured text, the hint may help determine which address to associate with which name). Advantageously, the application may more accurately extract and classify features and/or entities from a next unstructured data record or may even be used to correct or re-classify structured data.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram illustrating a system 100 for extracting and classifying features and/or entities, according to one embodiment of the invention. An entity (dossier) may be a set of identity records believed to refer to the same person. The networked system 100 includes a computer 102. The computer 102 is connected to a context data store 170 via a network 130. In one embodiment, the context data store 170 contains contextual information related to features of one or more entities. The computer 102 may also be connected to other computers via the network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system (not shown). Examples of operating systems include UNIX, versions of the Microsoft Windows® operating system, and distributions of the Linux® operating system. More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers and the data source 170 via the network 130.

The storage 108 may be a persistent storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices. Further, while embodiments are described herein with reference to a context data store 170 connected to the computer 102 via the network 130, in alternative embodiments, the context data store 170 may reside in the storage 108 of the computer 102.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards (not shown). Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes an application 150 for 100 for extracting and classifying features and/or entities. The memory 106 also includes a data record 152 that contains at least one feature 154 of one or more entities. In one embodiment, the application 150 extracts the at least one feature 154 from the data record 152. The application 150 may characterize the extracted feature 154. The application 150 may retrieve, from the context data store 170, data 172 related to the feature 154. The application 150 may recharacterize the feature 154 based on the retrieved data. The application 150 may update the context data store 170 to store an association 174 between the recharacterized feature and the retrieved data, to provide a hint for a subsequent feature extraction. As a result, the application 150 may more accurately extract features and/or entities from a next data record.

In the embodiment described above, the application 150 functions as both a hint service and entity extraction service. In alternative embodiments, the hint service may manage the context data store 170 and provide context-sensitive hints to discreet processes that perform the entity extraction service, thus improving the ability of the entity extraction service to extract and/or characterize features and/or entities. The entity extraction service may request the hint service to provide hints to the entity extraction service. In alternative embodiments, the application 150 functions only as the hint service while a separate application functions as the entity extraction service. In such cases, the separate application may execute on the computer 102 or on another computer that is connected to the computer 102 via the network 130.

As described above, in one embodiment, the entity extraction service may characterize features based on hints received from the hint service. For example, the entity extraction service may be prepared to classify "Golden Gate" in "San Francisco" (found in unstructured text) as a bridge. The entity extraction service may request a hint from the hint service. The request may include "Golden Gate" as a feature and "San Francisco" as context for the feature. In response, the hint service may provide a hint that includes two records. The first record may indicate that a Golden Gate Bridge exists in San Francisco, that is 1.2 miles long and that was built in 1956. The second record may indicate that a Golden Gate Restaurant exists in San Francisco and is located at 123 Chinatown Avenue.

In one embodiment, using the hint provided by the hint service, the entity extraction service may look further in the unstructured text and discover the text "123 Chinatown Avenue" in a next sentence. Accordingly, the entity extraction service may consider the reference to "Golden Gate" in the unstructured text to be a restaurant and not a bridge. Consequently, the entity extraction service may extract "Golden Gate" from the unstructured text and classify "Golden Gate" as a restaurant. The extracted and classified feature may be sent to the application 150 to be stored as an assertion. The context data store may also determine and assert that two entities reference the same entity (entity resolution). Assertions may also include a determination that two entities are related. The assertions may be provided from the hint service to the entity extraction service to improve subsequent feature extraction and classification.

FIG. 2 illustrates an exemplary data record 152, according to one embodiment of the invention. As shown, the exemplary data record 152 contains unstructured text—specifically, a police narrative in this particular example. In one embodiment, the application 150 may extract one or more features from the data record 152. For example, the application 150, acting as the entity extraction service, may extract "Jackson Hewitt" from the data record 152 as a feature of an entity.

FIG. 3 illustrates features 308 extracted and classified by the application 150, according to one embodiment of the invention. As shown, the features 308 include a value 302 of the feature, a classification 304 of the feature, and a measure 306 of certainty associated with the classification 304. For example, the application 150 extracts "Jackson Hewitt" as a feature from the data record 152 of FIG. 2. Further, the application 150 classifies the feature "Jackson Hewitt" as a company name, with an associated measure of certainty of 96% (i.e., of "Jackson Hewitt" actually being a company name).

In some cases, the entity extraction service may incorrectly classify a feature from the data record 152. For example, "Jackson Hewitt" may be a name of an individual, rather than a company name. In one embodiment, the entity extraction service retrieves, from the context data store 170, data 172 related to the extracted feature 154.

FIG. 4 illustrates exemplary data 408 related to the extracted feature 154, according to one embodiment of the invention. As shown, the exemplary data 408 related to the extracted feature 154 includes a name 402, an address 404, and a classification 406. The data 408 indicates that an individual, Jackson Hewittt, is associated with the address of 1342 S. Bell Ave., Apt. 56. The entity extraction service may determine that due to the presence of another string in data record 152—namely, the address of 1342 S. Bell Ave., Apt. 56.—matches the address from the data 408. Depending on the embodiment, the presence of another string may be provided to the entity extraction service as a hint or may be identified in the unstructured data (i.e., not previously extracted). Accordingly, the entity extraction service may recharacterize "Jackson Hewitt" as a name of an individual, rather than a company name. It Is within this invention to also determine from a hint to abandon classifying a classifiable feature based on the context provided by the hint service—a most simple example being not to extract an address if the address is already known.

FIG. 5 illustrates features 508 extracted and classified by the entity extraction service, according to one embodiment of the invention. As shown, the feature "Jackson Hewitt" has been recharacterized by the entity extraction service as a name of an individual, with a measure of certainty of 99.9%.

In some cases, a vast amount of data 172 may be related to an extracted feature 154. Retrieving the vast amount of data 172 may impair performance of the application 150 and/or of the context data store 170. FIG. 6 illustrates frequency information 606 computed from the related data 172, according to one embodiment of the invention. The application 150 may retrieve the frequency information 606 from the context data store 170. The frequency information 606 includes a frequency value 602 and a feature type 604. The frequency information 606 indicates that the amount of data 172 may be vast—i.e., that there are over a thousand businesses and over four hundred individuals related to the extracted feature 154.

In one embodiment, instead of retrieving a vast amount of data from the context data store 170, the application 150 (as the hint service) may instead query the context data store 170 using additional features extracted from the data record 152. For example, the application 150 may query the context data store 170 using the features "Jackson Hewitt" and "1342 Bellwether Ave Apt 56". In response, the application 150 may return to the entity extraction service an indication that there is one individual associated with the features "Jackson Hewitt" and "1342 Bellwether Ave Apt 56".

FIG. 7 illustrates frequency information 702 computed from the related data 172, based on the query from the application 150, which is acting as the hint service, according to one embodiment of the invention. As shown, the frequency information 702 indicates that there is only one match for the features "Jackson Hewitt" and "1342 Bellwether Ave Apt 56"—namely, an individual. Accordingly, the entity extraction service may recharacterize the feature "Jackson Hewitt" as a name of an individual, rather than a company name (e.g., to yield the features 508 of FIG. 5).

In one embodiment, the application 150, acting as the hint service, may generate one or more hints for the entity extraction service regarding the recharacterized feature in the context data store 170. For example, assume that the application 150 receives a first record containing "Jackson Hewitt", "1342 Bellwether Ave Apt 56", and "123 456 7890" (a phone number not previously known). As described above, using the address "1342 Bellwether Ave Apt 56", the entity extraction service may conclude that Jackson Hewitt is a business and not an individual. Further, the application 150 may record one or more assertions based on the characterization (i.e., of Jackson Hewitt as an individual). For example, the application 150 may store an assertion that any record that refers to the same Jackson Hewitt should also be classified as having a feature "Jackson Hewitt" as a name of an individual. For instance, if the entity extraction service receives a next record that includes only "Jackson Hewitt" and "123 456 7890", the application 150 may retrieve the stored assertion from the context data store 170 and, based on the assertion, classify "Jackson Hewitt" as a name of an individual, even though the next record did not contain any address associated with Jackson Hewitt. Accordingly, the hint service uses previous feature classifications to provide hints to the entity extraction service to allow the entity extraction service to classify features more accurately. In other words, what the hint service learns is persisted in the context data store 170 for use providing extraction and classification hints for subsequent records handled by entity extraction service.

In one embodiment, the entity extraction service may probabilistically and/or deterministically classify features and/or generate assertions based on classified features. For example, the application 150 may receive a next record containing "Jackson Hewitt" and probabilistically classify "Jackson Hewitt" as an individual, if the name "Jackson Hewitt" is statistically rare and if a "Jackson Hewitt" was previously classified as an individual. In an alternative embodiment, if "Jackson Hewitt" is not necessarily statistically rare, the entity extraction service may receive a next record containing "Jackson Hewitt", a phone number, and a passport number, and deterministically classify "Jackson Hewitt" as an individual if a "Jackson Hewitt" with the same phone number and passport number was previously classified as an individual. The entity extraction service may be configured to apply deterministic rules and/or probabilistic rules to classify features and/or generate assertions. The deterministic rules and probabilistic rules may be predefined by a system administrator or learned over time by the entity extraction service. Accordingly, the entity extraction service may classify features and/or generate assertions more effectively.

Figure 8:
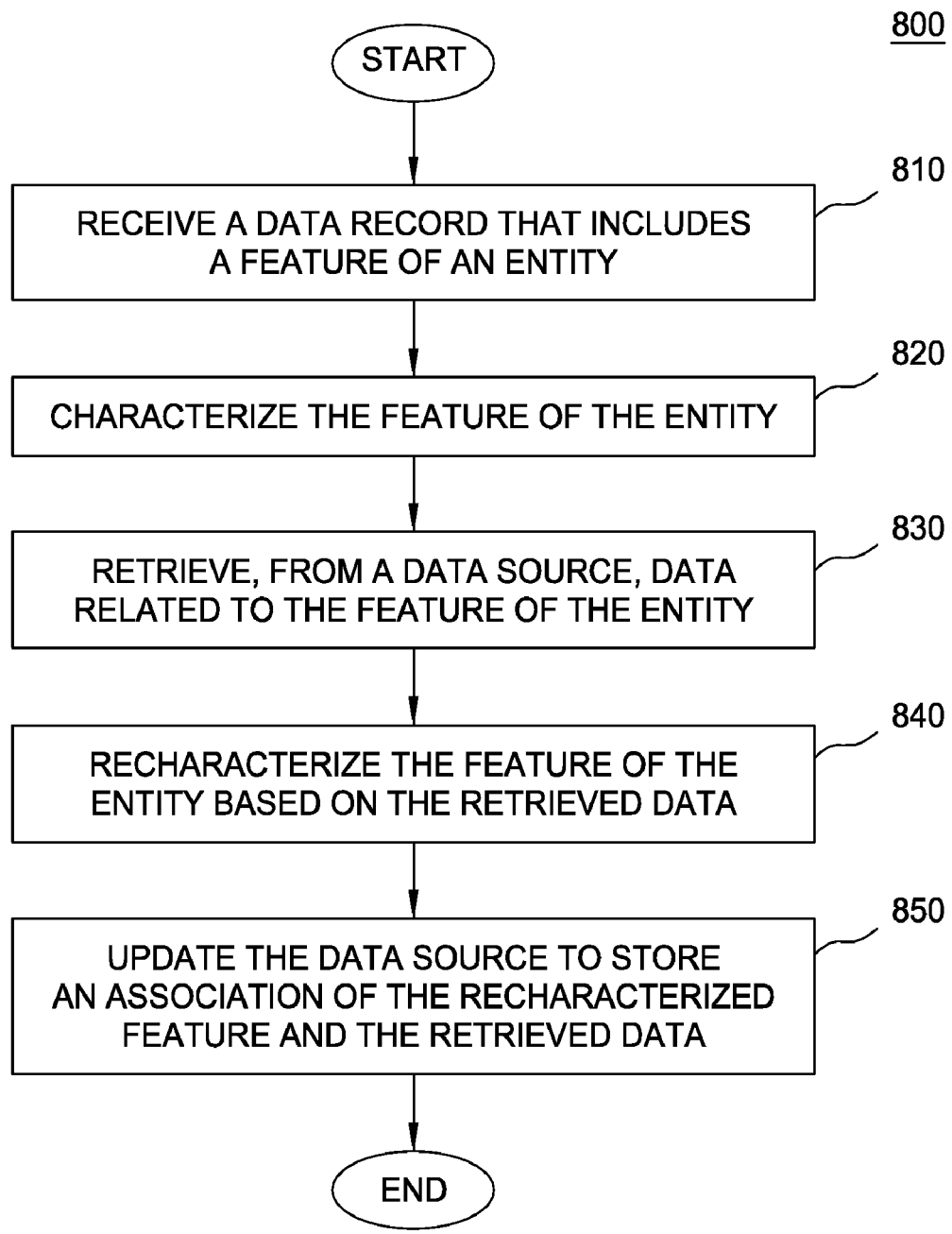
FIG. 8 is a flowchart depicting a method for extracting and classifying features of an entity, according to one embodiment of the invention.

FIG. 8 is a flowchart depicting a method 800 for extracting and classifying features of an entity, according to one embodiment of the invention. As shown, the method 800 begins at step 810, where the entity extraction service receives a data record that includes a feature of an entity. The data record may include unstructured text, structure data, video, audio, biometrics, etc. For example, the entity extraction service may receive the data record 152 of FIG. 2. At step 820, the entity extraction service characterizes at least one feature of the entity. For example, the entity extraction service may characterize the features 308 of FIG. 3. In an alternative embodiment, the entity extraction service may not necessarily initially characterize the feature. Instead, the entity extraction service may present the feature to the hint service for an initial classification. Subsequent to classification via the hint, the entity extraction service may extract additional features and seek additional hints (iteratively or recursively), prior to making a final assertion.

At step 830, the application (hint and context service) 150 may retrieve, from a data source, data related to the characterized feature. For example, the application (hint and context service) 150 may retrieve, from the context data store 170, the related data 408 of FIG. 4. At step 840, the entity extraction/classification service may recharacterize the feature of the entity, based on the retrieved data. For example, the entity extraction/classification service may recharacterize "Jackson Hewitt" as an individual, as shown in the extracted features 508 of FIG. 5. At step 850, the application (hint and context service) 150 may update the data source to store the asserted classification of the feature. For example, the application (hint and context service) 150 may update the context data store 170 with an assertion that a feature "Jackson Hewitt" that is associated with a feature "1342 Bellwether Ave Apt 56" is an individual, not a company. The application hint and context service) 150 may use the updated context data store 170 to assist entity extraction and classification to more accurately extract features from subsequent data records. After the step 850, the method 800 terminates.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Advantageously, embodiments of the invention provide techniques for extracting and classifying features of an entity. In one embodiment, an entity extraction service and a hint service may be provided. The entity extraction service may receive a data record that contains at least one feature of an entity. The entity extraction service may or may not initially characterize the feature of the entity. The hint service may retrieve from a data source, data related to the feature being characterized. The entity extraction service may characterize or recharacterize the feature based on the retrieved data. The hint service may update the data source to store the asserted characterized feature. The hint service may use the updated data source to more accurately provide hints to the entity extraction service for processing subsequent data records.

While the foregoing is directed to embodiments of the present invention, other and further embodiments of the invention may be devised without departing from the basic scope thereof, and the scope thereof is determined by the claims that follow.

What is claimed is:

1. A computer-implemented method to extract and characterize features from unstructured data, the method comprising:

evaluating a first feature of a plurality of features of unspecified type that are extracted from a first unstructured data element, based on one or more feature characterization rules and further based on a plurality of predefined feature types, to determine a measure of accuracy of a first feature type and a second feature type of the plurality of predefined feature types, respectively, in characterizing the first feature;

upon determining that the measure of accuracy of the first feature type is greater than the measure of accuracy of the second feature type, characterizing the first feature as being an instance of the first feature type;

reevaluating the first feature by operation of one or more computer processors and based the one or more feature characterization rules and the plurality of predefined feature types and further based on retrieved contextual information pertaining to a second feature of the plurality of extracted features, to determine whether the second feature type has a new measure of accuracy greater than the measure of accuracy of the first feature type; and upon determining that the new measure of accuracy of the second feature type is greater than the measure of accuracy of the first feature type, recharacterizing the first feature as being an instance of the second feature type;

wherein a third feature corresponding to the first feature and extracted from a second unstructured data element is evaluated based on the one or more feature characterization rules, the plurality of predefined feature types, and retrieved contextual information pertaining to the third feature and including the second feature, the second feature type being stored as contextual information pertaining to the first feature.

2. The computer-implemented method of claim 1, wherein the first feature pertains to a first entity, and wherein the method further comprises:

extracting a feature of a second entity from a second unstructured data element; and characterizing the extracted feature of the second entity, based on the recharacterized feature of the first entity.

3. The computer-implemented method of claim 1, wherein the contextual information is retrieved from a data store configured to accumulate information pertaining to at least one feature of one or more entities.

4. The computer-implemented method of claim 1, wherein the first unstructured data element contains at least one of textual data, image data, audio data, video data, and biometric data.

5. The computer-implemented method of claim 1, wherein the first feature pertains to a first entity, and wherein the contextual information pertaining to the feature of the first entity is retrieved from a data source via a plurality of recursive requests made prior to characterizing the first feature of the first entity.

6. The computer-implemented method of claim 1, wherein the first feature pertains to a first entity, and wherein the contextual information pertaining to the first feature of the first entity is retrieved from a data source based on the first feature of the first entity and an additional feature in the first unstructured data element.

7. The computer-implemented method of claim 1, wherein the first feature is recharacterized as being an instance of the second feature type and not an instance of the first feature type, and wherein the first feature, upon determining that the measure of accuracy of the first feature type does not satisfy a predefined accuracy threshold, is not stored as contextual information pertaining to the first feature.

8. The computer-implemented method of claim 7, further comprising:

upon determining that the measure of accuracy of the second feature type, satisfies the predefined accuracy threshold, storing the second feature type as contextual information pertaining to the first feature.

9. The computer-implemented method of claim 8, wherein the third feature is determined to be of the second feature type, without first determining that the third feature is of the first feature type.

10. The computer-implemented of claim 9, wherein the method is performed by an application configured to:

upon determining that contextual information pertaining to the first feature exceeds a predefined size threshold, evaluate the first feature based the one or more feature characterization rules and the plurality of predefined feature types and further based on the retrieved contextual information pertaining to the second feature, to determine that the first feature is of the second feature type, without first determining that the first feature is of the first feature type, and without first retrieving the contextual information pertaining to the first feature.

11. The computer-implemented method of claim 10, wherein the first feature is different from the second feature, wherein the first feature type is different from the second feature type, wherein the first unstructured data element contains at least one of textual data, image data, audio data, video data, and biometric data, and wherein the contextual information for each feature specifies attributes of features of different types, matching the respective feature.

12. A computer program product to extract and characterize features from unstructured data, the computer program product comprising:

a computer-readable storage memory having computer-readable program code embodied therewith, the computer-readable program code comprising:

computer-readable program code configured to evaluate a first feature of a plurality of features of unspecified type that are extracted from a first unstructured data element, based on one or more feature characterization rules and further based on a plurality of predefined feature types, to determine a measure of accuracy of a first feature type and a second feature type of the plurality of predefined feature types, respectively, in characterizing the first feature;

computer-readable program code configured to, upon determining that the measure of accuracy of the first feature type is greater than the measure of accuracy of the second feature type, characterize the first feature as being an instance of the first feature type;

computer-readable program code configured to reevaluate the first feature by operation of one or more computer processors when executing the computer-readable program code and based the one or more feature characterization rules and the plurality of predefined feature types and further based on retrieved contextual information pertaining to a second feature of the plurality of extracted features, to determine whether the second feature type has a new measure of accuracy greater than the measure of accuracy of the first feature type; and computer-readable program code configured to, upon determining that the new measure of accuracy of the second feature type is greater than the measure of accuracy of the first feature type, recharacterize the first feature as being an instance of the second feature type;

wherein a third feature corresponding to the first feature and extracted from a second unstructured data element is evaluated based on the one or more feature characterization rules, the plurality of predefined feature types, and retrieved contextual information pertaining to the third feature and including the second feature, the second feature type being stored as contextual information pertaining to the first feature.

13. The computer program product of claim 12, wherein the first feature pertains to a first entity, and wherein the computer-readable program code further comprises:
- computer-readable program code configured to extract a feature of a second entity from a second unstructured data element; and
- computer-readable program code configured to characterize the extracted feature of the second entity, based on the recharacterized feature of the first entity.

14. The computer program product of claim 12, wherein the contextual information is retrieved from a data store configured to accumulate information pertaining to at least one feature of one or more entities.

15. The computer program product of claim 12, wherein the first unstructured data element contains at least one of textual data, image data, audio data, video data, and biometric data.

16. The computer program product of claim 12, wherein the first feature pertains to a first entity, and wherein the contextual information pertaining to the feature of the first entity is retrieved from a data source via a plurality of recursive requests made prior to characterizing the first feature of the first entity.

17. The computer program product of claim 12, wherein the first feature pertains to a first entity, and wherein the contextual information pertaining to the first feature of the first entity is retrieved from a data source based on the first feature of the first entity and an additional feature in the first unstructured data element.

18. A system to extract and characterize features from unstructured data, the system comprising:
- one or more computer processors; and
- a memory containing a program, which when executed by the one or more computer processors is configured to perform an operation comprising:
- evaluating a first feature of the plurality of features of unspecified type that are extracted from a first unstructured data element, based on one or more feature characterization rules and further based on a plurality of predefined feature types, to determine a measure of accuracy of a first feature type and a second feature type of the plurality of predefined feature types, respectively, in characterizing the first feature;
- upon determining that the measure of accuracy of the first feature type is greater than the measure of accuracy of the second feature type, characterizing the first feature as being an instance of the first feature type;
- reevaluating the first feature based the one or more feature characterization rules and the plurality of predefined feature types and further based on retrieved contextual information pertaining to a second feature of the plurality of extracted features, to determine whether the second feature type has a new measure of accuracy greater than the measure of accuracy of the first feature type; and
- upon determining that the new measure of accuracy of the second feature type is greater than the measure of accuracy of the first feature type, recharacterizing the first feature as being an instance of the second feature type;
- wherein a third feature corresponding to the first feature and extracted from a second unstructured data element is evaluated based on the one or more feature characterization rules, the plurality of predefined feature types, and retrieved contextual information pertaining to the third feature and including the second feature, the second feature type being stored as contextual information pertaining to the first feature.

19. The system of claim 18, wherein the first feature pertains to a first entity, and wherein the operation further comprises:
- extracting a feature of a second entity from a second unstructured data element; and
- characterizing the extracted feature of the second entity, based on the recharacterized feature of the first entity.

20. The system of claim 18, wherein the contextual information is retrieved from a data store configured to accumulate information pertaining to at least one feature of one or more entities.

21. The system of claim 18, wherein the first unstructured data element contains at least one of textual data, image data, audio data, video data, and biometric data.

22. The system of claim 18, wherein the first feature pertains to a first entity, and wherein the contextual information pertaining to the feature of the first entity is retrieved from a data source via a plurality of recursive requests made prior to characterizing the first feature of the first entity.

23. The system of claim 18, wherein the first feature pertains to a first entity, and wherein the contextual information pertaining to the first feature of the first entity is retrieved from a data source based on the first feature of the first entity and an additional feature in the first unstructured data element.

* * * * *